(12) United States Patent
Weidinger et al.

(10) Patent No.: US 11,888,659 B2
(45) Date of Patent: Jan. 30, 2024

(54) RFID IC WITH DISTURBANCE FILTER FOR DIGITALLY MODULATED SIGNALS

(71) Applicant: NXP B.V., Eindhoven (NL)

(72) Inventors: Christian Weidinger, Graz (AT); Heinz Umfahrer, Graz (AT)

(73) Assignee: NXP B.V., Eindhoven (NL)

( * ) Notice: Subject to any disclaimer, the term of this patent is extended or adjusted under 35 U.S.C. 154(b) by 21 days.

(21) Appl. No.: 17/817,905

(22) Filed: Aug. 5, 2022

(65) Prior Publication Data
US 2023/0062060 A1   Mar. 2, 2023

(30) Foreign Application Priority Data

Sep. 2, 2021   (EP) .................................. 21194519

(51) Int. Cl.
*H04L 27/06*   (2006.01)
*H04W 4/80*   (2018.01)

(52) U.S. Cl.
CPC .............. *H04L 27/06* (2013.01); *H04W 4/80* (2018.02)

(58) Field of Classification Search
CPC ..... H04L 27/06; H04W 4/80; G06K 19/0723; G06K 7/0008; H04B 5/0031; H04B 15/00
See application file for complete search history.

(56) References Cited

U.S. PATENT DOCUMENTS

| | | | | |
|---|---|---|---|---|
| 9,350,577 B2 * | 5/2016 | Murdoch | ............ | H04L 25/4902 |
| 2008/0310484 A1 * | 12/2008 | Shattil | ................ | H04L 27/2614 |
| | | | | 375/E1.002 |
| 2009/0232197 A1 * | 9/2009 | Mimura | ............... | H04B 1/7174 |
| | | | | 375/239 |
| 2010/0079261 A1 | 4/2010 | Goto et al. | | |
| 2010/0259363 A1 * | 10/2010 | Landt | .................. | G06K 7/0008 |
| | | | | 340/10.1 |

FOREIGN PATENT DOCUMENTS

| | | |
|---|---|---|
| WO | 2008/119960 A1 | 10/2008 |
| WO | 2014/196646 A1 | 12/2014 |

OTHER PUBLICATIONS

ISO/IEC 14443-2 "Cards and Security Devices for Personal Identification—Contactless Proximity Objects—Part 2: Radio Frequency Power and Signal Interface"; Fourth Edition; Jul. 2020.
ISO/IEC 14443-3 "Cards and Security Devices for Personal Identification—Contactless Proximity Objects13 Part 3: Initialization and Anticollision"; Fourth Edition; Jul. 2018.

(Continued)

*Primary Examiner* — Dac V Ha (57) ABSTRACT

There is described an RFID IC, comprising:
i) an RFID interface configured to receive a digitally modulated signal, wherein the digitally modulated signal comprises: a first slot with a first pulse, and a second slot with a second pulse; and
ii) a processing unit configured to
a) determine a first position of the first pulse in the first slot,
b) filter a region that follows the determined first position of the first pulse,
c) determine a second position of the second pulse in the second slot, and, if the second position of the second pulse cannot be determined in the second slot, assume that the second position of the second pulse in the second slot is at the filtered region.

20 Claims, 3 Drawing Sheets

(56) References Cited

OTHER PUBLICATIONS

ISO/IEC 15693-1 "Cards and Security Devices for Personal Identification—Contactless Vicinity Objects—Part 1: Physical Characteristics"; Third Edition; Jul. 2018.
ISO/IEC 15693-2 "Cards and Security Devices for Personal Identification—Contactless Vicinity Objects—Part 2: Air Interface and Initialization"; Third Edition; Apr. 2019.
ISO/IEC 15693-3 "Cards and Security Devices for Personal Identification—Contactless Vicinity Objects—Part 3: Anticollision and Transmission Protocol"; Third Edition; Apr. 2019.
NFC Forum; Type 5 Tag Technical Specification; Version 1.0; Apr. 27, 2018.

* cited by examiner

RFID IC WITH DISTURBANCE FILTER FOR DIGITALLY MODULATED SIGNALS

CROSS-REFERENCE TO RELATED APPLICATIONS

This application claims priority under 35 U.S.C. § 119 to European Patent Application No. 21194519.1, filed on Sep. 2, 2021, the contents of which are incorporated by reference herein.

TECHNICAL FIELD

The present disclosure relates to an RFID IC with an RFID interface configured to receive a digitally modulated signal, and a processing unit for processing the received digitally modulated signal using a filter. Further, the present disclosure relates to an RFID arrangement that comprises the RFID IC and a further RFID IC. Additionally, the present disclosure relates to a method of demodulating a digitally modulated RF signal. The disclosure may hence relate to the technical field of RFID and NFC communication.

TECHNICAL BACKGROUND

RF communication devices include radio-frequency identification (RFID) devices, for example smart cards, smart phones, keys, or tags. RFID tags, also known as inlays, labels or transponders, are widely used to identify an object, to which the tag is attached. The most common application examples of the RFID tags are retail, supply chain management, shipping services, airline luggage tracking, laundry services, etc.

RFID tags are hereby part of RFID systems, which typically include an RFID reader and one or more RFID tags which are associated to one or more objects. The RFID reader is composed by a transmitter section, to transmit the (modulated) RF signals to the tag, and by a receiver, to receive the (modulated) information of the tag. The standard communications between a reader and a tag, and vice versa, are specified in protocols. Applications include, among others, contactless transactions, data exchange, and simplified setup of more complex communications such as Wi-Fi or bluetooth.

NFC (Near Field Communication) is hereby a short-range wireless technology (distances measured in centimeters). In order to make two NFC devices communicate, users may bring them close together or even make them touch. NFC is an established standard and is considered, in the context of this document, as a specific form of RFID.

In particular, ISO 15693 is a relevant RFID standard for HF vicinity transponder ICs (e.g. read range up to 1 m). Standard-compliant products provide RF-communication technology for transmitting data between an RFID device (e.g. card or tag) and a further RFID device (e.g. reader device). For example, in electronic ticketing for public transport, travelers can wave a smart card over a reader at the turnstiles or entry point, benefiting from improved convenience and speed in the ticketing process. Such products can be important to individual mobility, and can support multiple applications such as road tolling, libraries, public transport, and access control. T5T (tag type 5 standard, based on the ISO 15693 standard) NFC devices are technically and economically on the rise and may provide advantages such as a higher read range, smaller form factors, and an additional usability for logistics.

RFID devices in communication with each other, for example an RFID reader and an RFID tag, communicate via digitally modulated signals. Depending on the data coding mode (bit encoding), a digitally modulated signal may comprise a plurality of time slots and each slot may comprise a pulse (also termed a symbol) at a specific position to encode one or more bits. However, demodulating such a digitally modulated RF signal in an RFID communication environment may still be considered a challenge. This may be especially the case, when the ISO 15693 standard and the T5T standard are used together in an RFID communication device. Specific examples of this configuration are described in the following.

Figure 3:
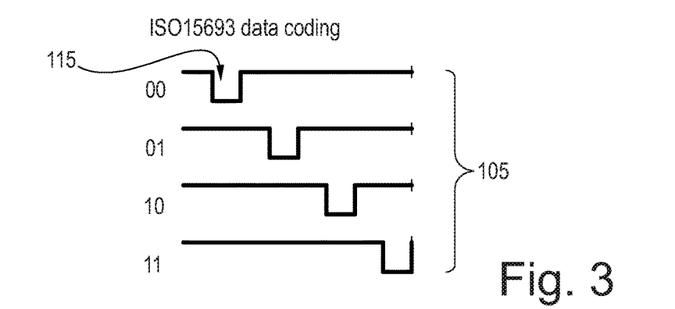
FIG. 3 illustrates a data coding according to ISO15693 standard.

FIG. 3 shows an example of an ISO 15693 data coding (bit encoding) that is termed "1 out of 4" (1oo4) mode. Here, two bits are encoded in each slot, depending on which position (there are four pulse positions) a pulse (symbol) is present. There are shown four modulated signals 105, each of which comprises exactly one (time) slot. A pulse 115 at the first slot position encodes the two bits "00", a pulse 115 at the second position encodes the bits "01", a pulse 115 at the third position encodes the bits "10", and a pulse 115 at the last position encodes the bits "11".

Figure 4:
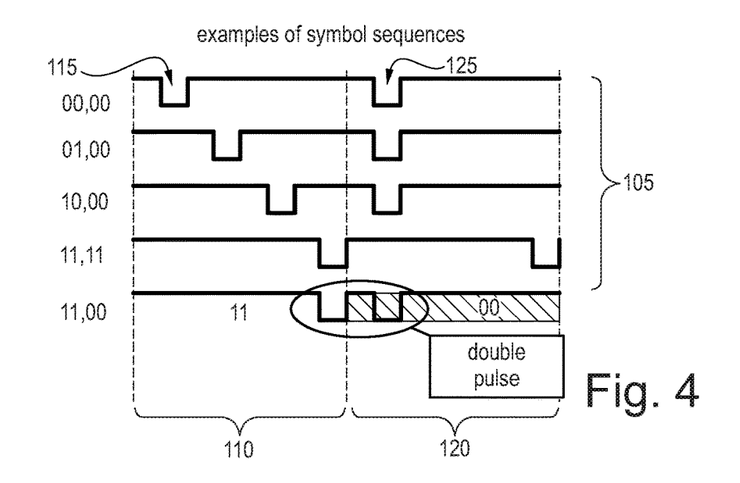
FIG. 4 illustrates a "1 out of 4" data encoding mode and a double pulse scenario.

FIG. 4 illustrates a common issue that may occur with the encoding scheme described for FIG. 3. After the first slot 110 (comprising a first pulse 115 at a respective first position), there follows a second slot 120 (in time after the first slot 115) comprising a second pulse 125 at a second position. This encoding scheme functions properly for the first four digitally modulated signals 105 that encode the terms "00, 00", "01,00", "10,00", and "11,11", respectively. However, in case that the first slot 110 encodes term "11" (first pulse 115 at last position of the first slot 110) and the second slot encodes term "00" (second pulse 125 at first position of the second slot 120), a minimum spacing is generated, that leads to a so-called double-pulse. Such scenarios also exist in other data encoding schemes as well, for example in the "1 out of 256" (1oo256) mode. There, term "0xFF" or term "start of frame (SOF)" followed by term "0x00" can generate a minimum spacing (double pulse).

A specific issue that can occur in the context of an RFID device that applies the ISO 15693 standard and the NFC T5T standard (which is a subset of ISO 15693) together. For digital modulation, in this case, ASK (amplitude shift keying) is applied. The terms "10% ASK" (e.g. 10-30%) and "100% ASK" (e.g. 90-100%) refer to different ASK modulation schemes which are known in the art and are established. While NFC T5T standard supports only 100% ASK (modulation), ISO 15693 supports both, 100% ASK and 10% ASK. Although there seems to be a large difference between e.g. 30% and 90% ASK, it may be inherent to an RFID device to (at least partially) interpret 30% ASK as 90% ASK. This error may occur depending on e.g. tuning of the transponder, modulation shape, ringing, field strength, and on-chip limiter characteristics. Therefore, it may be beneficial, if an RFID device can decode a mixture of 10% and 100% ASK throughout a signal, when operating in an ISO15693 environment. Nevertheless, this capability may be disadvantageous in an NFC T5T environment, since T5T supports only 100% ASK. T5T allows higher overshoots in the modulation waveshapes than ISO 15693. These overshoots cannot trigger a 100% ASK signal, but a 10% ASK signal (a 10% ASK pulse may thus be caused by overshoots at the end of a 100% ASK pulse). Such a 100% ASK pulse, followed by an erroneous 10% ASK pulse (e.g. caused by an overshoot), may be interpreted by the RFID device as a regular double pulse scenario.

Figure 5:
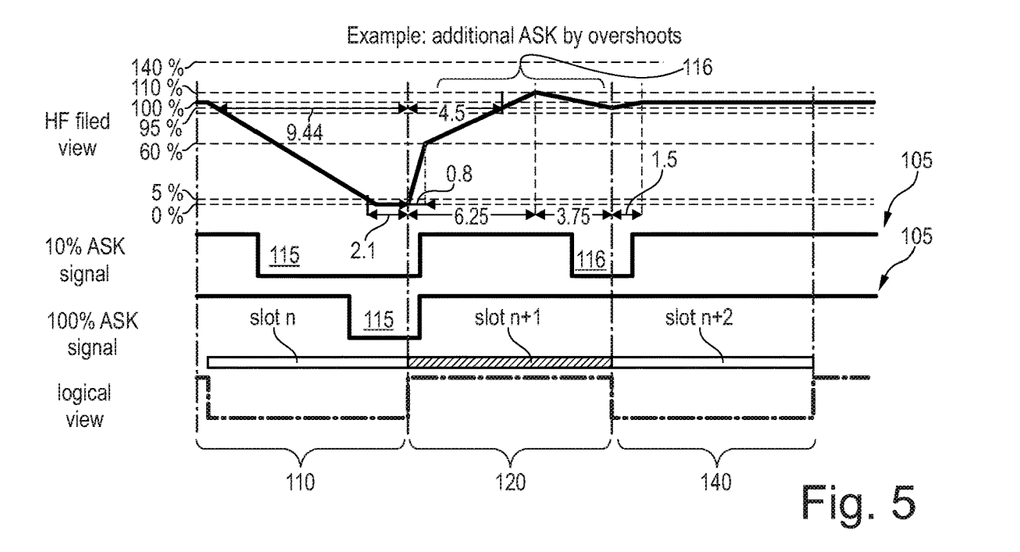
FIG. 5 illustrates the occurrence of an overshoot and a corresponding erroneous demodulation.

FIG. 5 illustrates the above-described scenario, wherein the following views are shown from top to bottom: HF field view (received signal), the determined 10% ASK signal, the determined 100% ASK signal, and the logical view (interpretation by RFID device). The received digitally modulated signal 105 comprises an 100% ASK modulation pulse 115 in a first slot 110. This pulse 115 is correctly determined in 100% ASK and 10% ASK determination. However, the pulse 115 is followed by a disturbance 116, being an overshoot that reaches up to 110% (T5T allows overshoots up to 110% with this timing (in particular even up to 140%, if the rising edge is very steep)). The overshoot 116 triggers the 10% ASK demodulator and is mapped to the logical view of a double pulse. While there is no second pulse in the determined 100% ASK modulation, an erroneous pulse 116 has been determined in 10% ASK modulation. The RFID device will interpret this error as a valid ASK pulse sequence in the protocol.

OBJECT AND SUMMARY

There may be a need to demodulate a digitally modulated RF signal (in particular in an RFID/NFC context) in a reliable and robust manner.

An RFID IC, an RFID arrangement, and a method of demodulating a digitally modulated RF signal according to the independent claims are provided.

According to an aspect of the present disclosure, an RFID communication device (in particular an RFID IC) is described, comprising:
 i) an RFID (NFC) interface configured to receive a digitally modulated signal (e.g. ASK modulation), wherein the digitally modulated signal comprises: a first slot with a first pulse (that encodes one or more bits), and a second slot (that follows the first slot in time) with a second pulse (that encodes one or more bits), and
 ii) a processing unit (control unit) configured to
 a) determine a first position of the first pulse in the first slot (e.g. at the last pulse position in the slot),
 b) filter (e.g. using a gate) a region (that may comprises a pulse and/or a disturbance) that follows the determined first position of the first pulse (thus, the region may be in the first slot and/or the second slot),
 c) determine a second position of the second pulse in the second slot (if so, then the second slot may be demodulated/decoded), and,
 if the second position of the second pulse cannot be determined in the second slot (i.e. then a code violation occurs), (then)
 assume that the second position of the second pulse in the second slot is at (least partially at) the filtered region (and has been cancelled by the filter).
In particular, the processing unit is further configured to demodulate the first slot and/or the second slot of the digitally modulated signal.

According to a further aspect of the present disclosure, there is described an RFID arrangement, comprising:
 i) an RFID IC (e.g. a tag) as described above, and
 ii) a further RFID IC (e.g. a reader) configured to transmit the digitally modulated signal to the RFID IC.

According to a further aspect of the present disclosure, there is described a method of demodulating a digitally modulated RF signal, the method comprising:
 i) receiving the digitally modulated signal, wherein the digitally modulated signal comprises a first slot with a first pulse, and a second slot with a second pulse,
 ii) determining a first position of the first pulse in the first slot (and demodulating the first slot),
 iii) filtering a region that follows the determined first position of the first pulse,
 iv) determining a second position of the second pulse in the second slot (and then demodulate the second slot), and,
 if the second position of the second pulse cannot be determined in the second slot, (then) assuming that the second position of the second pulse in the second slot is at the filtered region (and in particular restore the second pulse at the second position).

In the context of the present disclosure, the term "RFID IC" may in particular refer to a device that is enabled to interact with communication via radio frequency RF, in particular using RFID, more in particular NFC. An RFIC IC may be a smaller unit than an RFID communication device. For example, an RFID communication device may comprise the RFID IC and an antenna. An RFID IC may be implemented for example in an RFID tag (IC and antenna), a smart card, a card reader, a key, or a mobile phone. An RFID IC may be implemented in a tag or a reader.

In the context of the present disclosure, the term "RFID" (radio-frequency identification) may refer to a technique that uses electromagnetic fields (RF field) to communicate via short distances, in particular 10 meter or less. The term "RFID device" may refer to any device that has an RFID functionality. An RFID device may include an antenna and an integrated circuit with a transmitter and/or a receiver. A typical RFID system may include an RFID reader and one or more RFID tags which are associated to one or more objects. In an example, a first RFID device comprises a transmitter to transmit the RF signals to a second RFID device, and a receiver, to receive the modulated information of the second RFID device. The standard communication between RFID devices are specified in protocols. An RFID functionality may for example be implemented in a tag, a smart card, a card reader, or a mobile phone.

In the context of the present application, the term "NFC" may refer to Near Field Communication which may be a short-range wireless technology (distances measured in centimeters). In order to make two NFC devices communicate, users may bring them close together or even make them touch. NFC may be considered as an established standard. In the present document, the NFC standard may be considered as a specific form of RFID. An NFC functionality may for example be implemented in a tag, a smart card, a card reader, or a mobile phone.

In the context of the present disclosure, the term "digitally modulated signal" may refer to a signal that has been modulated using a digital modulation scheme. While amplitude-(AM) and frequency-modulation (FM) are generally considered as analog modulation schemes, digital modulation schemes may comprise amplitude-(ASK), frequency-(FSK), and phase-shift keying (PSK). In digital modulation, an analog carrier signal may be modulated by a discrete signal. The changes in the carrier signal may be chosen from a finite number of alternative symbols (implemented as pulses). In the context of the present disclosure, a digitally modulated signal may comprise a plurality of defined time slots (sequence). Each slot may encode one or more bits, depending at which position in the slot a pulse is provided.

According to an exemplary embodiment, the present disclosure may be based on the idea that an RFID IC, which demodulates a digitally modulated signal in a reliable and robust manner, may be provided, when a region that follows a determined first position of a first pulse in the first slot of the signal is filtered. Thereby, disturbances, such as overshoots, may be cancelled in an efficient and easy manner. The erroneous detection of double-pulses and other failures may thus be prevented reliably. Nevertheless, it may be crucial to, in case that no second pulse is determined in the second slot, assume that the position of said second pulse is at the filtered region. It may be clearly determinable, if the second pulse is only absent because it is positioned with minimum space to the first pulse (real double pulse). In such a case, the second pulse at the second position in the second slot may be restored in a reliable and easy manner. Afterwards, the first slot and the second slot (either by determining or restoring the second pulse) may be demodulated.

The described demodulation may be implemented in a straightforward manner in a plurality of RFID (in particular NFC) devices. Thereby, minimum spacing scenarios (which may often occur in digital modulated signals) may be overcome in a reliable and robust manner, even though RFID (NFC) devices are often (due to small sizes) significantly limited in their computing power. The described demodulation may in particular resolve conflicts between ISO15693 and NFC T5T requirements (see detailed discussion above) and may help to overcome potential difficulties of the demodulator to detect e.g. a 10% ASK modulation shortly after another one.

DESCRIPTION OF EXEMPLARY EMBODIMENTS

In the following, further exemplary embodiments of the device, the arrangement, and the method will be explained.

According to an exemplary embodiment, the processing unit is further configured to restore the second position of the second pulse in the second slot at the filtered region. In an example, the pulse is actively restored. In another example, it is assumed that the pulse is present, which may for example result in the term "00". Thus, even though the second pulse has been cancelled, it may be reliably reproduced.

According to a further exemplary embodiment, the processing unit is further configured to, if the second position of the second pulse in the second slot is determined and/or restored, demodulate the second slot. Thereby, demodulation is efficiently possible, even though a filter has been applied.

According to a further exemplary embodiment, the processing unit is further configured to assume that the position of the second pulse in the second slot is at the filtered region only, if the first position of the first pulse is at the last position in the first slot. Additionally or alternatively, the processing unit is further configured to assume that the position of the second pulse in the second slot is at the filtered region only, if the filtered region is at the first pulse position of the second slot. These scenarios correspond to the presence of a double pulse at the border between first slot and second slot. Hereby, it may be especially probable that the filter region cancels the second pulse. Using the described approach, critical double pulse scenarios may be reliably resolved.

According to a further exemplary embodiment, the digitally modulated signal comprises a disturbance (in particular an overshoot or an erroneous pulse) following the first pulse. Such a disturbance may thus be filtered efficiently and reliably. Overshoots may in particular occur after a first (100% ASK) pulse (see FIG. 5).

According to a further exemplary embodiment, the start of the disturbance (e.g. start/rising edge of a pulse/overshoot) is following the start of the filtered region (beginning of filter activity). This measure may be efficient with respect to the limited resources of an RFID IC (e.g. in a tag). While filtering may be preferably done during pulse processing, restoring may be preferably done during a pulse-to-symbol decoding.

According to a further exemplary embodiment, the RFID IC is configured according to the ISO15693 standard. Thereby, the IC is configured according to a potentially highly relevant standard for present and future applications. ISO/IEC 15693 is an ISO standard for vicinity cards which can normally be read out by a reader without being powered themselves, as the reader will supply the necessary power to the card in a wireless manner. ISO 15693 systems operate at the 13.56 MHz frequency and offer read ranges from short range communication (read) distance (in the millimeter range) to long communication distance (up to 1 m range) depending on the reader power and antenna sizes. Specific applications may include libraries, ski passes, and public transportation.

According to a further exemplary embodiment, the RFID IC is configured according to the NFC T5T standard. Also in this case, the IC is configured according to a potentially highly relevant standard for present and future applications. Tag type 5 is a tag configuration that is based on ISO 15693, while tag type 2 (T2T) and tag type 4 (T4) are based on ISO 14443. T5T may provide advantages regarding the read range, the form factor and usability for logistics. While the ISO 15693 standard configurations can handle 10% and 100% ASK modulation, the (NFC) T5T configuration can only handle 100% ASK modulation.

According to a further exemplary embodiment, the RFID IC is configured according to the ISO15693 standard and the NFC T5T standard. This embodiment may be preferable, because both standards together may provide an efficient and robust RFID/NFC environment. Issues with signal demodulation (see FIG. 5) may be overcome in a reliable manner using the described filter technique. Such a combination product, that can reliably deal with 100% ASK and 10% ASK, may be highly desirable.

According to a further exemplary embodiment, the digitally modulated signal is modulated by amplitude shift keying, ASK. ASK may be a form of amplitude modulation that represents digital data as variations in the amplitude of a carrier wave. In an ASK system, a symbol (pulse), representing one or more bits, may be sent by transmitting a fixed-amplitude carrier wave at a fixed frequency for a specific time duration.

According to a further exemplary embodiment, the digitally modulated signal comprises 10% ASK and/or 100% ASK. There are two different kinds of ASK modulation (waveforms) that are established and known to the skilled person. Details like how to calculate the modulation index are defined in the relevant standards, e.g. ISO15693.

According to a further exemplary embodiment, it is inherent to the processing unit to partially interpret 100% ASK as 10% ASK (see examples in FIGS. 6a to 6e). Even though there seems to be a clear difference between 100% ASK and 10% ASK, an RFID IC (processing unit) may sometimes not be able to distinguish the ASK modulations. For example, a disturbance (such as an overshoot) in 100% ASK may be interpreted as a 10% ASK pulse (see FIG. 5). It may be advantageous to overcome this issue.

According to a further exemplary embodiment, the disturbance in the filtered region comprises a 10% ASK pulse or is at least partially interpreted as a 10% ASK pulse by the processing unit. A specific example of this scenario has been described for FIG. 5. Using the described filter technique, such issues may be reliably overcome.

According to a further exemplary embodiment, the first position of the first pulse is at the last pulse position in the first slot, and the second position of the second pulse is at the first pulse position in the second slot. This scenario may correspond to a common double pulse problem (see FIG. 4). Using the described filter technique, such issues may be reliably overcome.

According to a further exemplary embodiment, the digitally modulated signal comprises a "1 out of 4" mode and/or a "1 out of 256" mode. These modes are common bit encoding modes used in RFID/NFC environments. Thus, the described technique may be applied to relevant industry standards in a straightforward manner.

According to a further exemplary embodiment, the "1 out of 4" mode is applied, wherein the first pulse corresponds to term "11", and wherein the second pulse corresponds to term "00". As has been described for FIG. 4, this encoding corresponds to a double pulse scenario.

According to a further exemplary embodiment, the "1 out of 256" mode is applied, wherein the first pulse corresponds to term "0xFF" or term "SOF" (start of frame) and the second pulse corresponds to term "0x00". The SOF may comprise "SOF to select 1 out of 4 mode" or "SOF to select 1 out of 256 mode".

According to a further exemplary embodiment of the RFID arrangement, the further RFID IC is configured to digitally modulate the signal either by 10% ASK or 100% ASK, and it is inherent to the RFID IC to partially interpret 100% ASK as 10% ASK, in particular in case when a disturbance occurs. While the reader device may be able to modulate using only one ASK modulation scheme, the tag device may not always be able to clearly distinguish the ASK modulation schemes during demodulation. This issue may, however, be overcome by the described filter technique.

The aspects defined above and further aspects of the present disclosure are apparent from the examples of embodiment to be described hereinafter and are explained with reference to these examples of embodiment. The disclosure will be described in more detail hereinafter with reference to examples of embodiment but to which the disclosure is not limited.

BRIEF DESCRIPTION OF THE DRAWINGS

The illustrations in the drawings are schematic. In different drawings, similar or identical elements are provided with the same reference signs.

DETAILED DESCRIPTION OF THE DRAWINGS

Before, referring to the drawings, exemplary embodiments will be described in further detail, some basic considerations will be summarized based on which exemplary embodiments of the present disclosure have been developed.

According to an exemplary embodiment of the present disclosure, tag ICs compliant to ISO 15693 and NFC T5T need to decode ASK modulation pulses which can be very close (minimum spacing) in certain symbol sequences (e.g. "3" followed by "0") (double pulses). ISO 15693 offers the choice of two ASK modulation indices: 10% or 100% ASK (i.e. 10 . . . 30% or 90 . . . 100%). Although there seems to be a lot of margin between 30% and 90% ASK, in reality 30% ASK can look like 90% modulation on chip level (see FIGS. 6a-e). This can occur depending on tuning of the transponder, modulation shape, ringing, field strength and on-chip limiter characteristics.

According to an exemplary embodiment, the modulation index, which the RFID IC "sees" (interprets), can change which the RFID IC sees (e.g. 30% ASK can look like 90% modulation on chip level). In an example, when a modulation pulse occurs, the antenna voltage (Vin) drops, the input capacitance (Cp) of the RFID IC changes, and therefore, the tuning of the transponder. Depending on the tuning of the transponder at continuous wave, the resulting tuning during the modulation may be improved or degraded in comparison to the tuning at continuous wave. As a consequence, the resulting modulation index may be higher or lower than originally transmitted by the reader. In this manner, for example, a 30% modulation may increase to a level which is interpreted as 100% modulation by the RFID IC (processing unit). These effects are illustrated in the FIGS. 6a to 6e.

Figure 6A:
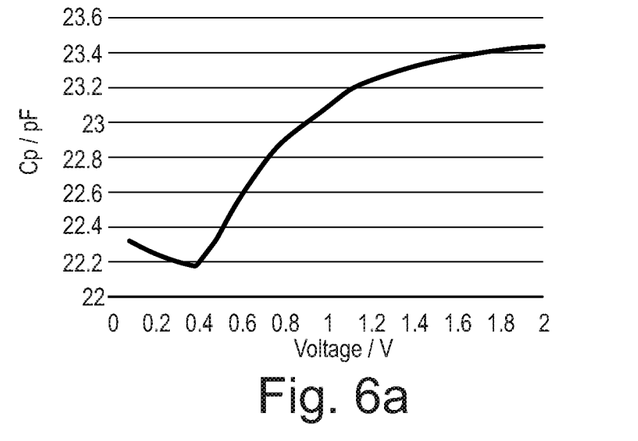
FIGS. 6a to 6e illustrate the effects that can change the modulation index seen by the RFID IC.

FIG. 6a shows a relation between input capacitance (Cp) and antenna voltage (Vin): when the voltage increase, the capacitance increases as well (and the other way around).

Figure 6B:
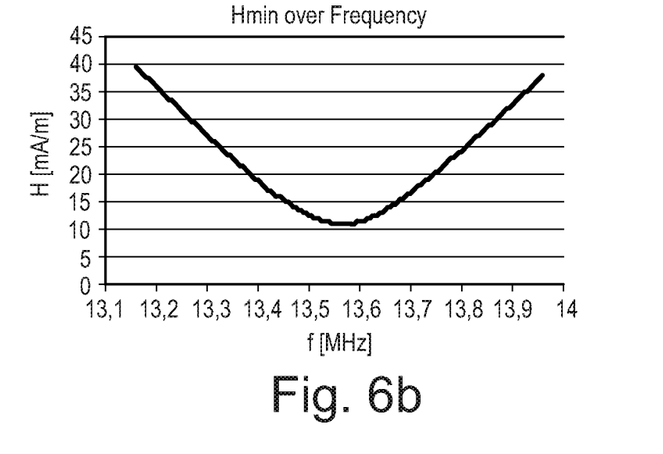

FIG. 6b shows a relation between magnetic field strength H and (resonance) frequency f: H is lowest exactly at the resonance frequency 13.56 MHz.

Figure 6C:
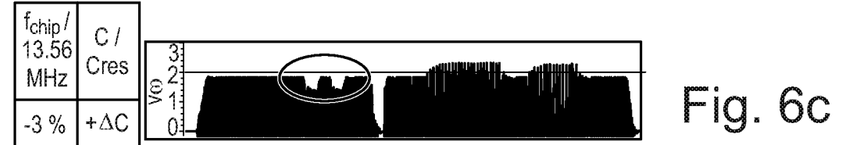

FIG. 6c shows an example, wherein a transponder is tuned below resonance frequency with additional tuning capacity. The voltage drops during modulation, the capacity Cp of the RFID device goes down, while the tuning of the RFID device goes up. This effect moves the RFID device into the direction of resonance. In this case, the chip may be tuned better than during continuous wave and the resulting modulation depth may be lower.

Figure 6D:
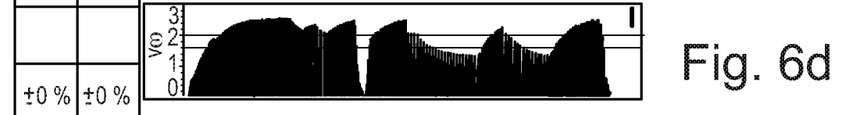

FIG. 6d shows an example of a "perfectly" tuned case.

Figure 6E:
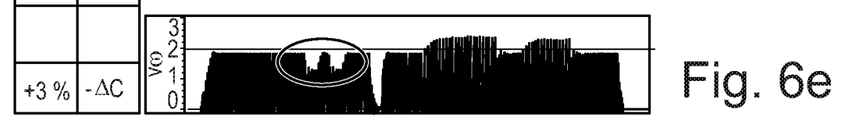

FIG. 6e shows an example, wherein a transponder is tuned above resonance with additional tuning capacity. The voltage drops during modulation, the capacity Cp of the RFID device goes down, while the tuning of the RFID device goes up. This effect moves the RFID device further away from resonance. In this case, the chip may be tuned worse than during continuous wave and the resulting modulation depth may be higher.

According to an exemplary embodiment, it is beneficial if a chip can decode a mixture of 10% and 100% ASK throughout a command when operating in an ISO 15693 environment. NFC T5T is a sub-set of ISO 15693 supporting only 100% ASK, however, allowing higher overshoots in the modulation waveshapes than ISO 15693. These overshoots cannot trigger a 100% ASK signal, but a 10% ASK signal. Such a 100% ASK signal followed by a 10% ASK signal caused by an overshoot can look like a regular double pulse scenario for the chip. The present disclosure proposes a scheme how to resolve this conflict between ISO 15693 and NFC T5T requirements. It also helps to overcome potential difficulties of the demodulator to detect a 10% ASK shortly after another one.

According to an exemplary embodiment of the present disclosure, the following steps can be performed: i) ISO 15693 uses 1oo4 coding (among others), the value is encoded in the position of an ASK pulse, ii) pulses potentially caused by an overshoot are filtered, iii) a double pulse (pulse with minimum spacing) can occur depending on the sequence of symbols, and iv) in case of such a situation, a real double pulse is assumed in case of a code violation. In this embodiment also a missing double pulse is restored irrespective of the used modulation index. This can be beneficial, since detecting a pulse short after another one is a limiting factor in analog demodulator design, because the first pulse changes the operating point of the demodulator for the second one.

Figure 1:
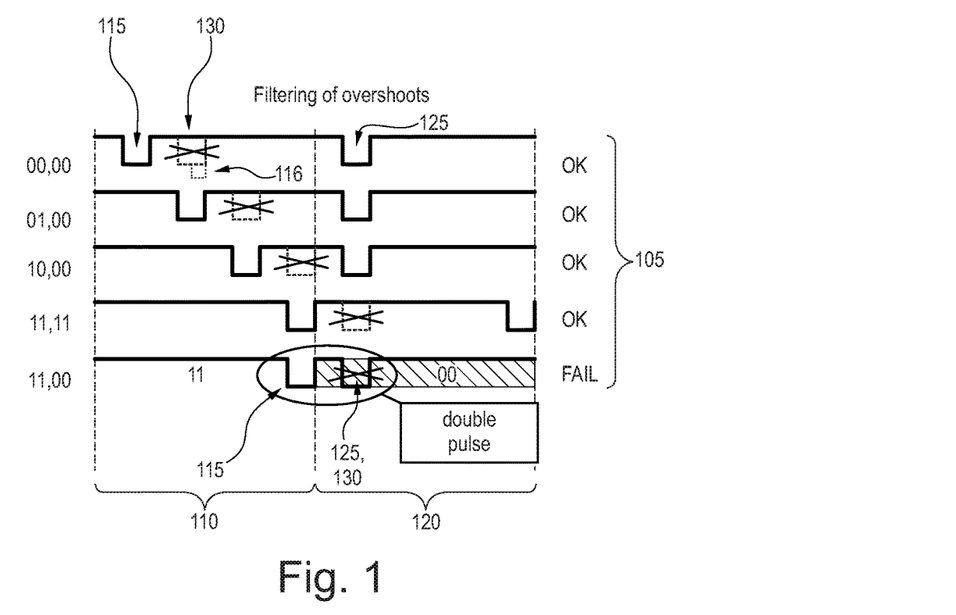
FIG. 1 illustrates a method of demodulating a digitally modulated RF signal according to an exemplary embodiment of the present disclosure.

FIG. 1 illustrates a method of demodulating a digitally modulated RF signal 105 according to an exemplary embodiment of the present disclosure. In the example shown, the signals 105 have been modulated by an RFID reader using amplitude shift keying (ASK) and have been transmitted to an RFID IC (tag). The RFID IC comprises an RFID interface to receive the signals 105 and a processing unit for processing (in particular demodulating) the signals 105.

There are shown five digitally modulated RF signals 105 that correspond to those shown in FIG. 4 (see above). Each signal 105 comprises a first slot 110 and a second slot 120. Further, each first slot 110 comprises a first pulse 115 at a first position and each second slot 120 comprises a second pulse 125 at a second position. The difference to the example of FIG. 4 is, that a region 130 that follows the determined first pulse 115 is filtered. Thereby, e.g. pulses caused by an overshoot, may be filtered. The filter can be implemented with different measure, for example by a gate such as an AND-gate. Preferably, the start of a pulse or disturbance (that may follow the first pulse) is following (timely after) the start of the filtered region 130. In this manner, each pulse or disturbance that follows (directly) after the first pulse can be efficiently cancelled. For the first four signals 105, this scheme functions properly. The corresponding second pulse 125 at the second position can be determined and then both, the first slot 110 and the second slot 120, can be demodulated. In other words, the encoded bits of the respective signal 105 are then decoded.

In the last signal 105, however, there is a minimum spacing between the first pulse 115 at the last position of the first slot 110, and the second pulse 125 at the first position of the second slot 120 (double pulse). In this case, the second pulse 125 is in the filtered region 130 and will be cancelled. This circumstance may result in a failure during demodulation.

Figure 2:
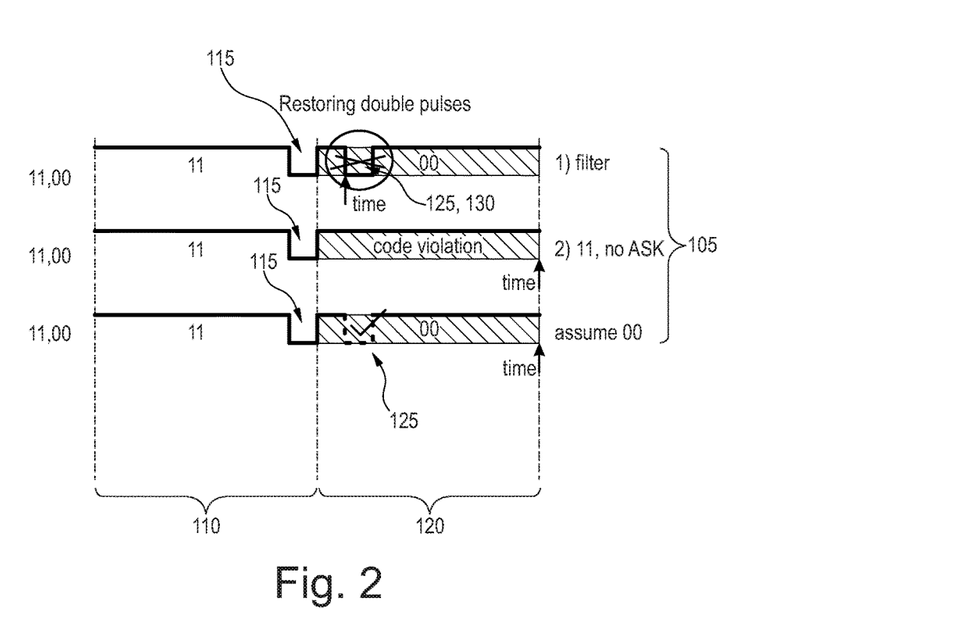
FIG. 2 illustrates a method of demodulating a digitally modulated RF signal according to another exemplary embodiment of the present disclosure.

FIG. 2 illustrates a method of demodulating a digitally modulated RF signal 105 according to another exemplary embodiment of the present disclosure. The example of FIG. 2 is based on the last signal 105 of FIG. 1, wherein the second pulse 125 has been cancelled by the filter step 130. In this manner, the second pulse 125 cannot be determined in the second slot 120. Since there is no pulse and no ASK modulation left, a code violation occurs. Nevertheless, based on the fact that no second pulse is present at all, it is assumed that the position of the second pulse 125 is at the filter region 130. Following this assumption, the second pulse 125 can be restored at the position of the filter region 130. In the example shown (1oo4 mode), the term "00" is assumed. Hence, after the restoring, both, the first slot 110 and the second slot 120, can be efficiently decoded.

In this specification, embodiments have been presented in terms of a selected set of details. However, a person of ordinary skill in the art would understand that many other embodiments may be practiced which include a different selected set of these details. It is intended that the following claims cover all possible embodiments.

REFERENCE NUMERALS

105 Digitally modulated signal
110 First slot
115 First pulse
116 Disturbance, overshoot
120 Second slot
125 Second pulse
130 Filtered region

The invention claimed is:
1. An RFID IC, comprising:
an RFID interface configured to receive a digitally modulated signal, wherein the digitally modulated signal comprises:
a first slot with a first pulse;
a second slot with a second pulse; and
a processing unit configured to determine a first position of the first pulse in the first slot, filter a region that follows the determined first position of the first pulse, determine a second position of the second pulse in the second slot, and if the second position of the second pulse cannot be determined in the second slot, assume that the second position of the second pulse in the second slot is at the filtered region.
2. The RFID IC according to claim 1, wherein the processing unit is further configured to restore the second position of the second pulse in the second slot at the filtered region.
3. The RFID IC according to claim 1, wherein the processing unit is further configured to, if the second position of the second pulse in the second slot is at least one of determined and restored, demodulate the second slot.
4. The RFID IC according to claim 1, wherein the processing unit is further configured to assume that the position of the second pulse in the second slot is at the filtered region only, if the first position of the first pulse is at the last position in the first slot.
5. The RFID IC according to claim 1, wherein the digitally modulated signal comprises a disturbance following the first pulse.
6. The RFID IC according to claim 5, wherein the disturbance comprises an overshoot.
7. The RFID IC according to claim 5, wherein the start of the disturbance is following the start of the filtered region.
8. The RFID IC according to claim 1, wherein the RFID IC is configured according to the ISO15693 standard.
9. The RFID IC according to claim 1, wherein the RFID IC is configured according to the NFC T5T standard.
10. The RFID IC according to claim 1, wherein the digitally modulated signal is modulated by amplitude shift keying, ASK.
11. The RFID IC according to claim 10, wherein the digitally modulated signal comprises at least one of 10% ASK and 100% ASK modulation.
12. The RFID IC according to claim 10, wherein it is inherent to the processing unit to partially interpret 100% ASK as 10% ASK.
13. The RFID IC according to claim 10, wherein the disturbance in the filtered region comprises a 10% ASK pulse or is at least partially interpreted as a 10% ASK pulse by the processing unit.

14. The RFID IC according to claim 1, wherein the first position of the first pulse is at the last pulse position in the first slot, and wherein the second position of the second pulse is at the first pulse position in the second slot.

15. The RFID IC according to claim 1, wherein the digitally modulated signal comprises at least one of a "1 out of 4" mode and a "1 out of 256" mode.

16. The RFID IC according to claim 15, wherein the "1 out of 4" mode is applied, wherein the first pulse corresponds to term "11", and wherein the second pulse corresponds to term "00".

17. The RFID IC according to claim 15, wherein the "1 out of 256" mode is applied, wherein the first pulse corresponds to term "0xFF" or term "SOF", and wherein the second pulse corresponds to term "0x00".

18. An RFID arrangement, comprising:
an RFID IC according to claim 1; and
a further RFID IC configured to transmit the digitally modulated signal to the RFID IC, wherein the further RFID IC is configured to digitally modulate the signal either by 10% ASK or 100% ASK, wherein it is inherent to the RFID IC to partially interpret 100% ASK as 10% ASK.

19. The RFID arrangement according to claim 18, wherein it is inherent to the RFID IC to partially interpret 100% ASK as 10% ASK in case when a disturbance occurs.

20. A method of demodulating a digitally modulated RF signal, the method comprising:
receiving the digitally modulated signal, wherein the digitally modulated signal comprises a first slot with a first pulse, and a second slot with a second pulse;
determining a first position of the first pulse in the first slot;
filtering a region that follows the determined first position of the first pulse;
determining a second position of the second pulse in the second slot, and
if the second position of the second pulse cannot be determined in the second slot, assuming that the second position of the second pulse in the second slot is at the filtered region.

* * * * *